United States Patent [19]

Jackson

[11] 4,192,749

[45] Mar. 11, 1980

[54] SCREENS FOR WATER INTAKES

[75] Inventor: Philip Jackson, Paris, France

[73] Assignee: E. Beaudry & Cie, Societe Anonyme, Paris, France

[21] Appl. No.: 919,605

[22] Filed: Jun. 27, 1978

[51] Int. Cl.² .................................................. B01D 33/02
[52] U.S. Cl. .................................... 210/107; 210/161
[58] Field of Search ............... 210/106, 107, 108, 109, 210/153, 154, 156, 157, 158, 159, 161, 392

[56] References Cited

U.S. PATENT DOCUMENTS

| | | | |
|---|---|---|---|
| 696,241 | 3/1902 | Johnson | 210/392 |
| 1,109,385 | 9/1914 | Allison | 210/157 X |
| 1,188,340 | 6/1916 | Tark | 210/161 X |
| 1,266,331 | 5/1918 | Schwinger | 210/157 |
| 1,542,288 | 6/1925 | D'Oller | 210/161 X |
| 1,591,821 | 7/1926 | Heaton | 210/392 |
| 1,726,608 | 9/1929 | Breckett | 210/161 |
| 2,022,336 | 11/1935 | Bower | 210/157 |

*Primary Examiner*—Theodore A. Granger
*Attorney, Agent, or Firm*—Charles E. Brown

[57] ABSTRACT

A screen for a water intake has a movable filter element and a recuperation channel adjacent the filter element arranged below the lowest water level. The concavity of the recuperation channel faces the filter element. Suction is applied at the recuperation channel to cause an opposite circulation of water through the filter element at this point. The recuperation channel acts as a safeguarding device for living elements in the water and the opposite circulation of water at the channel detaches living elements from the filter element without traumatism and urges them into the channel. The channel is provided with a filter spaced from the filter element for preventing living elements being entrained by the filter element and carried to the air.

10 Claims, 3 Drawing Figures

SCREENS FOR WATER INTAKES

BACKGROUND OF THE INVENTION

The present invention relates generally to screens which are usually installed in water intakes, whether these are river or sea water intakes, having a filter element for retaining debris and particles carried by water which is to be passed through the screen.

A screen of this kind is normally disposed downstream of a grid composed of bars placed a few centimeters apart and protecting the screen from debris of large dimensions. Such screens are disposed either singly or in association with one or more other screens of the same type at a screening station. The filter element, whose mesh provides openings of only a few millimeters, is movable so that it may be periodically freed of the debris and particles which, being of larger dimensions than those of its mesh, progressively obstruct all of its openings and therefore clog it.

The movable filter element may comprise a panel adapted to be raised in its own plane in alternation with another panel of the same type disposed parallel to it and at a distance from it.

Alternatively the movable filter element may comprise an endless loop of elongated cross-section forming a filter chain, or of circular or polygonal cross-section forming a filter drum.

Whatever the form of the filter element, the element passes cyclically from an immersed position, in which it is progressively charged with various debris and particles, to an emerged position in which it is subjected to the action of jets of water under pressure acting countercurrent in order to free it of particles and debris thus attached to its surface, and so to make it capable of functioning once again as a filter in the course of its subsequent immersion.

The particles and debris entrained by the washing water have up to the present time usually been collected entirely in a channel provided for the purpose, and discharged by the latter to a drain.

The fact that the debris and particles were of mineral and vegetable origin, or that they contained living elements, particularly fish, does not indeed appear to have been given attention up to the present time.

There is now a growing anxiety to protect nature, and in particular to protect elements living in an aqueous medium, and this causes a problem because the flow of water taken from rivers or the sea is increasing, particularly in view of the large volume of water required by nuclear power stations. Furthermore, there is a tendency to install water intakes for large flows on estuaries or at the seaside and this aggravates the problem, since living elements carried by the water in question do not have the advantage in such installations of the beneficial influence of a possible current limiting their entrainment, as is the case in certain water intakes on rivers which are rationally equipped for this purpose.

It now definitely appears that living elements, particularly fish, which are trapped and entrained by the filter element of a screen of a water intake of the kind discussed, are irremediably subjected to an often prolonged stay out of the water during the emergence phase of the filter element, to the action of jets of washing water applied to the latter, which usually is a powerful action, and to a consequent violent projection into the channel provided for the collection of all the particles and debris which temporarily clog the filter element in question.

Various devices have certainly already been proposed which are intended to equip a screening station for water intakes for safeguarding living elements, particularly fish, carried by the water passed through the screening station.

In these devices use is either made of special filters which by themselves ensure only that the fish are safeguarded without having any general screening action, or conventional screening filters obliging the fish to stay for a certain time out of the water.

The present invention has the general object of making it possible to achieve conjointly the desired screening of the water and the safeguarding of the fish.

SUMMARY

According to the present invention there is provided a screen for a water intake having a movable filter element and a recuperation channel arranged below the lowest water level, the recuperation channel extending transversely of the filter element on the upstream side of the latter in relation to the point where water to be passed through the screen passes through the filter element, the recuperation channel having a concavity facing said filter element and being subjected to the action of suction means arranged to cause, at a point corresponding to the recuperation channel, an opposite circulation of water through said filter element, wherein the recuperation channel is arranged to form a safeguarding device for the protection of any living elements, particularly fish, carried by the water which is to be passed through the screen, and the recuperation channel is provided with a filter having a profile corresponding to the profile of the path followed by the filter element, said filter being spaced from said path.

The invention is applicable to any screen having a movable filter element, whether the filter element is in the form of a filter panel screen, a filter drum, or a filter chain.

The suction means to be employed may very simply be the result of keeping the head of water in the recuperation channel lower than that existing on the downstream side of the filter element; they may also for example be the result of the utilisation of a fish pump connected directly or indirectly to the recuperation channel.

However the suction is produced, the inverse current circulation resulting therefrom at the recuperation channel is sufficient to detach from the filter element, without brutality, the living elements, particularly fish, entrained at that point, whilst these living elements are still immersed in their original medium. The living elements accompanied by a certain reduced number of pieces of debris of small dimension which are easily detachable are carried by the recuperation channel to their original medium either directly or with the interposition of a collection pit provided for the purpose, still without brutality and in their natural medium. In the event of a collection pit being provided, the living elements can be removed from the pit and returned unharmed to their original medium with the aid of any suitable apparatus, such as a fish pump, a discharge valve, or any other equipment, depending in particular on the layout of the screening station in relation to the original medium.

It is true that it has already been proposed, particularly in German Pat. No. 553,368 and in American Pat.

No. 1,591,821, to equip a screen with a suction nozzle forming a recuperation channel and connected to a pump adapted to produce suction through the filter element of the screen in order to detach therefrom the matter clogging the filter element.

However, this is just a simple unclogging device and not a device having the sole purpose of safeguarding fish; according to the invention the suction produced through the filter element is just sufficient to detach from it the living elements, particularly fish, without traumatism, and the said living elements freed in this manner regain their own motive capacity and can therefore move away from the filter element, taking additional advantage of the current produced by the aforesaid suction, while however the inert elements substantially remain adhering to the filter element, with the exception of the smallest of them, as previously described.

In addition, in these Patents a filter comparable to that provided on the recuperation channel of the screen is not provided, so that the living elements can be pressed against the filter element beyond this channel and therefore can be entrained to the open air by the filter element in an emerging zone of the latter, to their detriment.

Apart from the essential advantage of providing protection for the living elements carried by the water to be passed through the screen, the safeguarding device provided in accordance with the invention also has the advantages of being on the one hand totally static in itself, although if desired it may as a whole be removable, so that it is ensured of good strength, good reliability, and a long life, and on the other hand of being suitable for present-day technology in respect of screens having filter elements for water intakes, whatever the nature of this filter element, and therefore of being easily added, if desired, to existing screens.

BRIEF DESCRIPTION OF THE DRAWINGS

An embodiment of the present invention will hereinafter be described, by way of example, with reference to the accompanying drawings, in which:-

DESCRIPTION OF PREFERRED EMBODIMENTS

Figure 1:
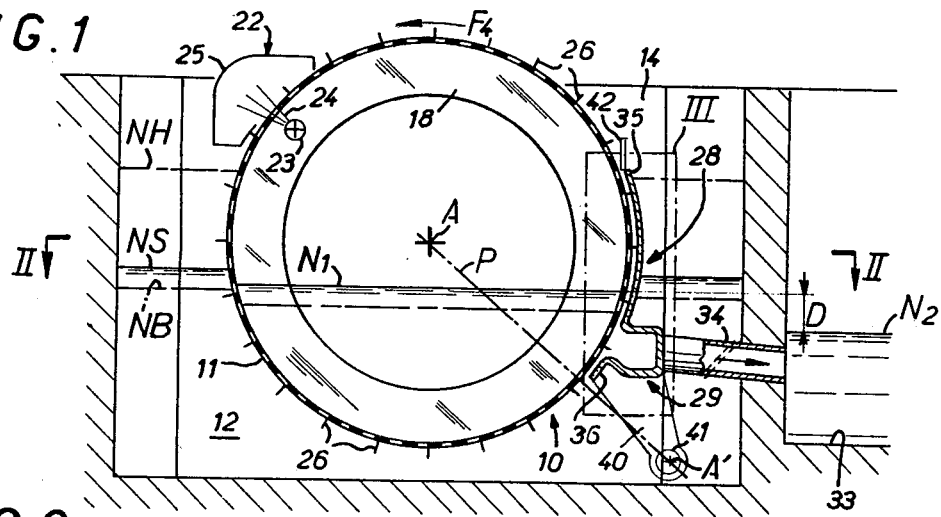
FIG. 1 is a view in cross-section of a screening station containing a fish safeguarding arrangement according to the invention, the section being taken on the broken line I—I in FIG. 2.
Figure 2:
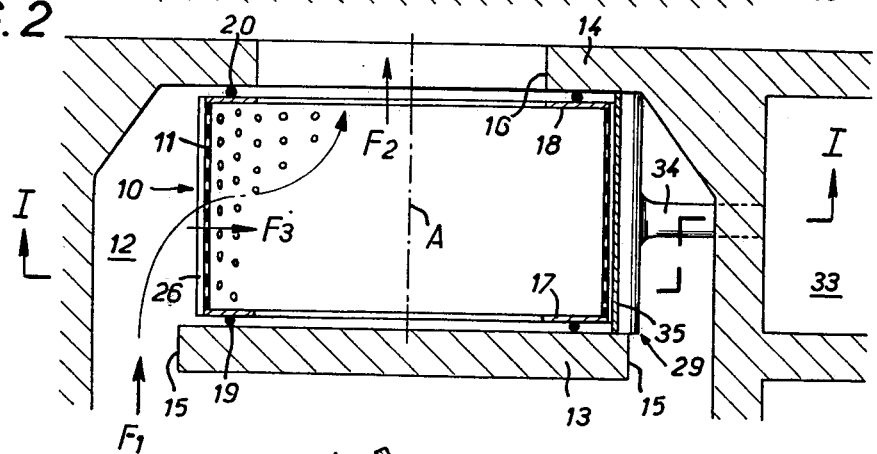
FIG. 2 is a view in plan and section of this screening station on the line II—II in FIG. 1.

The drawings illustrate, by way of example, the application of the invention to a screen forming a filter drum 10 of circular section, the filter element 11 of this screen being disposed on the periphery of a cylinder having a horizontal shaft A; this shaft A is represented in the drawings only by an axis shown in discontinuous lines in FIG. 2 and by the trace of this axis in FIG. 1.

In the example illustrated the drum 10 is disposed inside a chamber 12, between two vertical walls 13 and 14 partly bounding this chamber. The wall 13 defines laterally passages 15, of which at least one permits flow of water to be screened to enter the chamber 12 in the direction of the arrow F1 in FIG. 2, the wall 14 has an opening 16 on the axis of the filter drum 10 which enables the screened water to pass out of the compartment 12 in a water flow zone in the direction of the arrow F2 in FIG. 2.

The construction of the filter drum 10 is well known per se, and will therefore be described here only briefly.

As mentioned above, the filter element 11 with which the drum 10 is provided forms a cylinder, and the latter is supported at its axial ends by two annular plates 17, 18 fastened to the shaft A and intended to rotate the filter element.

Between the annular plates 17, 18 of the filter drum 10 and the walls 13, 14 of the chamber 12 are provided respectively annular seals 19, 20, which for example are carried by the said plates 17, 18 and rub against annular contact surfaces provided for the purpose on the said walls 13, 14.

In the embodiment illustrated the water which is to be filtered passes through the surface of filter element 11 from the outside or upstream side to the inside or downstream side, as indicated by the arrow F3 in FIG. 2.

It is however obvious that the water to be screened could circulate in the opposite direction, this water then entering the compartment 12 through the opening 16 in the wall 14 and passing out of this compartment 12 through the passages 15 provided laterally by the wall 13.

In practice, and as illustrated in FIG. 1, the filter drum 10 is only partially immersed in the water which is to be filtered.

In FIG. 1 there is shown at NS the normal operating level of the water to be filtered in the compartment 12, at NB the lowest water level, and at NH the highest water level.

Taking into account the loss of the head of the water to be filtered as it passes through the filter element 11, the level N1 of the filtered water inside the filter drum 10 is always lower than the level NS, outside this filter drum, of the water which is to be filtered.

A washing station 22 associated with the nonimmersed portion of the filter drum 10 is provided in the usual manner.

This washing station 22 is disposed above the highest water level NH on the side of the half of the nonimmersed portion of the filter drum 10 which is most downstream in relation to the direction of movement of the filter element, that is to say its direction of rotation, as indicated by way of example by the arrow F4 in FIG. 1.

In a manner known per se the washing station 22 comprises one or more washing units 23 in the interior of the filter drum adapted to throw substantially radially a sheet of water 24 through the surface of the filter element 11 of the said filter drum. In addition, the washing station 22 comprises a channel 25 arranged outside the drum in a position corresponding to that of the washing unit or units 23. The channel 25 has a concavity facing the filter element 11 and is adapted to receive the debris detached from the filter element by the sheet of water 24.

Figure 3:
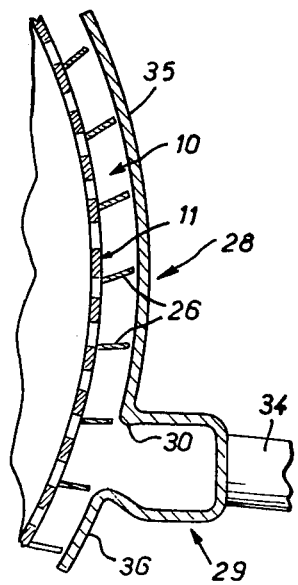
FIG. 3 shows on a larger scale the detail of the screening station enclosed in a box III in FIG. 1.

In practice, and as can be seen more clearly in FIG. 3, the filter element 11 carries fins 26 projecting from its periphery and elongated along generatrices thereof. These fins 26 are moved by the rotation of the drum and are adapted to entrain the debris and particles which adhere to the filter element.

According to the invention, the filter drum 10 is provided with a safeguarding device 28 comprising, slightly below the lowest water level NB, a recuperation channel 29 which extends transversely with respect to the filter element 11 on the upstream side of the latter in relation to the passage through this filter element of the water which is to be taken in, this channel 29 having its concavity facing the said filter element.

In practice, and as illustrated, this channel 29 extends over the entire length of the filter element 11, substantially along a generatrix of the latter, and is for example fastened at its ends to the wall 13, 14 between which the filter drum 10 in question is disposed (not shown in detail in the drawings).

Likewise in practice, and as illustrated, this recuperation channel 29 is associated with the half of the submerged portion of the filter element 11 which is most downstream in relation to the direction of movement of the said filter element, that is to say, as mentioned above, the direction of rotation of the latter.

In cross-section, that is to say perpendicularly to the axis of the filter drum 10, the recuperation channel 29 has a profile whose opening 30 (FIG. 3) has a height comparable with the curvilinear distance circumferentially separating two successive fins 26 on the filter element 11.

Over the remainder the channel 29 may have any profile; in the example illustrated it is generally quadrangular, or more precisely square, but it could for example be circular, oval, or polygonal.

Furthermore, the cross-section of the recuperation channel 29 is not necessarily constant over its entire length; it could on the contrary be adapted in dependence on the flow to be transported by this channel at each point of the latter.

In the embodiment illustrated the recuperation channel 29 is in communication with a collection pit 33 by way of a pipe 34 passing through the wall separating the compartment 12 from the said collection pit 33.

Suction means are provided to produce at the recuperation channel 29 an oppositely directed circulation of filtered water through the filter element 11, that is to say in the embodiment illustrated a circulation of filtered water passing from the interior or the filter drum 10 to the outside of the latter in the direction of the recuperation channel 29.

For example, and as diagrammatically indicated in the drawings, the suction means result from the fact that the level of water N2 in the collection pit 33 is kept lower by a predetermined amount D than the level existing on the downstream side of the filter element.

This difference D is kept constant, for example by suitably pumping from the collection pit 33, and can be controlled as required.

In the embodiment illustrated the recuperation channel 29 has associated with it a first shield member in the form of a filter 35 which extends over the entire length of the channel 29, and has a profile corresponding to the profile of the path followed by the filter element 11. The filter 35 is spaced from the filter element 11.

In the embodiment illustrated the profile of this filter 35 is therefore generally circular and concentric to the axis of the filter drum 10.

Whatever the profile of the filter 35, it extends slightly above the highest water level NH.

The filter 35 is provided to prevent unscreened water from reaching the filter element 11 by by-passing the recuperation channel 29, which would have the consequence that the living elements carried by the water would then be directly exposed to the action of the washing unit or units 23.

Similarly, in the embodiment illustrated, the recuperation channel 29 has associated with it a second shield member in the form of a filter 36 which extends downwardly and has a profile corresponding to the profile of the path followed by the filter element. The filter 36 is spaced from the filter element 11.

Preferably, and as illustrated, this second filter 36 extends in cross-section over a distance at least equal to the curvilinear distance circumferentially separating two successive fins 26 on the filter element 11.

The filter 36 is provided to prevent direct entry of any elements into the recuperation channel 29 between two fins 26, and therefore to prevent the possibility of jamming between a fin and the said channel.

Preferably, and as illustrated, the filters 35 and 36 are attached to the channel 29 and may for example be integral with it; this integral component could for example be a sectional member.

It will be appreciated that the safeguarding device 28 constructed in this manner is in itself entirely static.

In operation the living elements in the water which is to be taken in, particularly fish, together with the debris and particles carried by this water, are entrained in the direction of the filter drum 10 because of the current of water passing through the latter in the direction of the arrow F3 in FIG. 2, on the side of the most upstream portion of the submerged half of this filter drum.

The fish first struggle against this current in order to attempt to remain at a distance from the filter element 11, but at the end of a certain period of time they are exhausted and are inevitably—but without violence because of the relative weakness of this current—forced against this filter element.

They are then taken over by the filter element 11 and entrained by the latter in its submerged trajectory, from the most upstream portion of the submerged half of the filter drum 10 towards the most downstream portion of the latter.

When they arrive at the recuperation channel 29, and while they are therefore still in their original medium, they are urged by the countercurrent produced in the direction of this channel by the suction means established between the latter and the interior of the filter drum 10, and, still without brutality, are therefore detached from the filter element 11. The fish can then resume their own motive activity and are directed by the countercurrent in question towards the recuperation channel 29 and then discharged by the latter, together with a certain smaller number of small pieces of debris which are easily detachable, into the collection pit 33.

As mentioned above, the fish thus reaching this collection pit can be recovered from the latter by any suitable means in order to be returned to their original medium at some distance from the screening station concerned.

The suction head D established between the interior of the filter drum 10 and the collection pit 33 is so selected that, taking into account the passage section offered by the opening 30 of the recuperation channel 29, there will be at this opening just the speed of flow necessary for entrainment of the fish.

In this connection a suction head of a few centimeters may be sufficient, because this corresponds in practice to a speed of flow higher than the speed of approach of unscreened water, whereas the fish are usually not able to overcome a speed higher than this speed of approach, which presses them against the filter element.

Since moreover all negative pressure zones are avoided, the protection of the fish taken over by the safeguarding device 28 according to the invention is ensured.

The same is true of the auxiliary devices of the usual type which effect their removal from the collection pit 33.

Despite the fact that the safeguarding device 28 according to the invention is submerged in relation to the filter element 11, this does not in practice result in any reduction of filtering capacity of the corresponding filter drum 10.

As described above, the safeguarding device is in fact disposed adjacent the most downstream portion of the submerged half of the filter drum, and therefore in a zone of the drum where the filter element 11 is already in practice almost completely clogged by the various debris and particles adhering to its surface.

It follows that the safeguarding device, and particularly the filter 35 which, as described above, acts to prevent the by-passing of the channel 29 by the water which is to be taken in, only reduces the filtering surface available on the filter drum 10 to a negligible extent or, in practice, not at all.

Furthermore, any reduction in the filtering surface due to the safeguarding device only occurs when the water level is above its lowest value when the available filtering surface is greatest.

The safeguarding device 28 also acts to wash the filter element 11 and in some applications it is possible to dispense with the washing station 22.

Nevertheless, the washing effect of the safeguarding device 28 is necessarily and advantageously limited to the release of the more easily detachable debris, because the speed of flow of the countercurrent produced in it is necessarily low in order not to traumatise or injure the living elements which it is desired to protect; as illustrated, it is therefore preferable for a washing station 22 producing jets of water under pressure to be provided.

The safeguarding device is preferably disposed as close as possible to the filter element 11, or more precisely as close as possible to the fins 26 provided on the latter, the clearance left between the safeguarding device 28 and the fins being just sufficient to allow for the unavoidable manufacturing tolerances of the components in question and for the unavoidable installation tolerances.

If necessary, in order to avoid jamming of particles or debris of relatively large dimensions, the upstream edge of the safeguarding device 28, that is, in the embodiment illustrated, the free edge of the filter 36, may form a retractable engagement lip which is returned automatically, for example by a counterweight or spring; as an alternative, the entire safeguarding device may be retractable.

This latter alternative is illustrated in fine lines in FIG. 1. For example, instead of being fastened to the walls 13, 14 as described above, the recuperation channel 29 together with its filters 35 and 36 may be carried by a bracket 40 pivotally mounted on a pivot pin 41 whose axis A' is horizontal. In this alternative arrangement, the entire channel 29 extends above a plane P passing through this axis A' and the axis A of the filter element 10. In addition, at least one fixed stop 42 is provided and arranged to define a normal operating position of the device 28. Finally, in this case, the pipe 34 is either flexible or obliquely sectioned as a bellows, as indicated in discontinuous lines in FIG. 1.

With this alternative arrangement, any debris which may project beyond the fins 26 on the filter element 10 produces a force causing the recuperation channel 29 to momentarily retract, swinging backwards about the axis A' without interference with the fins in question. The channel 29 automatically resumes its normal operating position through the action of gravity.

The invention is not limited to the embodiment described and illustrated but includes any modified embodiment.

In particular, the utilisation of a collection pit 33 is not essential, since the living elements collected by the recuperation channel 29 can be returned directly to their original medium from the said channel. In this case one and the same device may if desired simultaneously provide the suction required at the recuperation channel and effect the propulsion of the living elements collected by the said channel towards their original medium. For example, a hydro-ejector or a fish pump could be used for this purpose.

When a collection pit is used, various means may be provided, depending on site conditions, for maintaining therein a level suitable for producing the predetermined suction in the recuperation channel, for example, the means may be an Archimedean screw, a noria, or a bubble elevator with overflow.

Obviously, the safeguarding device 28 is made of a material capable of withstanding prolonged immersion in marine or other aqueous medium.

Of course, the invention is not limited to filter drums but, as described above, can be used with any filter screen having a movable filter element, for example having a filter chain or a raisable panel screen.

I claim:

1. A water screen for a water intake, said water screen comprising an endless filter element having a surface constructed and arranged for movement about an axis and for the general radial flow of water therethrough, means defining a water flow zone with an inlet thereinto in which water being filtered may flow through said filter element surface, and safeguarding means associated with said filter element surface for safeguarding living matter particularly fish in water to be screened, said safeguarding means including a recuperation channel having an open end located adjacent said filter element surface remote from said water flow zone inlet and generally facing said filter element surface with said open end being located below said axis at a height relative to said filter element surface so as to be immersed during the operation of said water screen, suction means attached to said recuperation channel for effecting water flow through said filter element surface into said recuperation channel in a direction through said filter element reverse to the intended direction of flow of water to be filtered through said filter element, a shield member extending upwardly from said recuperation channel open end adjacent to said filter element surface, said shield member being of a configuration complimentary to the shape and path of movement of said filter element surface and being generally uniformly spaced from said filter element surface, whereby living matter entrained against said filter element surface is directed into said recuperation channel open end without being directed up and around said filter element surface.

2. A screen according to claim 1, in which said shield member extends upwardly from said recuperation channel to an extent that an upper end of said shield member remains above intended water levels in said water screen during all operations thereof.

3. A screen according to claim 1, in which said safeguarding means further include a second shield member which extends downwardly from said recuperation channel, said second shield member having a configuration complementary to the path of movement and shape of said filter element surface and being generally uniformly spaced therefrom.

4. A screen according to claim 3, in which said filter element carries axially extending fins projecting from its surface at regular intervals about said axis and said second shield member extends over a circumferential distance at least equal to the distance separating two successive fins on said filter element.

5. A screen according to claim 1, in which there are means for retractably mounting said recuperation channel for movement away from said filter element surface.

6. A screen according to claim 5, in which said filter element is in the form of a cylindrical drum having an axis corresponding to said first mentioned axis, and said mounting means includes a pivot pin pivotally mounting said recuperation channel, said recuperation channel extends entirely above a plane passing through the axis of said pivot pin and the axis of said drum, and in which at least one fixed stop is associated with said recuperation channel to define a normal operating position therefor relative to said filter element.

7. A screen according to claim 1 wherein in the intended position of said screen said suction means is defined by a head of water in said recuperation channel lower than that on the downstream side of said filter element.

8. A screen according to claim 7, in which there is a collection pit disposed lower than said recuperation channel, said recuperation channel is positioned to discharge water into said collection pit, and said means for maintaining the head of water in said recuperation channel lower than on the downstream side of said filter element surface includes said collection pit maintaining a level of water lower than the level of water inside said filter element surface.

9. A screen according to claim 1, in which said filter element carries axially extending fins projecting from its surface at regularly spaced intervals about said axis and when viewed in transverse cross-section said open end of said recuperation channel has a circumferential extent generally corresponding to the distance separating two successive fins on said filter element.

10. A screen according to claim 1 wherein said filter element is in the form of a cylindrical drum having an axis corresponding substantially to said first mentioned axis.

* * * * *

UNITED STATES PATENT AND TRADEMARK OFFICE
CERTIFICATE OF CORRECTION

PATENT NO. : 4,192,749
DATED : March 11, 1980
INVENTOR(S) : Philip Jackson

It is certified that error appears in the above-identified patent and that said Letters Patent are hereby corrected as shown below:

Insert in the heading the priority data:
    [30]      Foreign Application Priority Data
        July 1, 1977  [FR]  France ...... 77 20258

Signed and Sealed this

Fourteenth Day of July 1981

[SEAL]

*Attest:*

*Attesting Officer*

GERALD J. MOSSINGHOFF

*Commissioner of Patents and Trademarks*